3,268,472
CURING POLYTETRAHYDROFURAN WITH
SULFUR AND A PEROXIDE
Joginder Lal, Cuyahoga Falls, and Donald E. Heppert, Akron, Ohio, assignors to The Goodyear Tire & Rubber Company, Akron, Ohio, a corporation of Ohio
No Drawing. Filed July 14, 1961, Ser. No. 124,015
9 Claims. (Cl. 260—37)

This invention relates to high molecular weight in excess of 15,000 and preferably substantially saturated polymers prepared by the polymerization of tetrahydrofuran and, more particularly, it relates to a method of curing these polymers with sulfur and organic ditertiary peroxides.

It is known that tetrahydrofuran may be either homo- or copolymerized to produce polymers which may be hydroxyl terminated or which may contain other functional or non-functional groups. These polymers, i.e., the polyether glycols normally are extended and cured with organic polyisocyanates to produce resins or elastomeric products. Usually, the low molecular weight polymers of tetrahydrofuran, those having from 500 to about 4,000 molecular weight, are the ones that are extended with polyisocyanates. The higher molecular weight polyether glycols such as those having molecular weights in excess of about 10,000 are not used for extension because they not only present problems in handling but under practical conditions do not extend as well as the lower molecular weight polymers.

It has been discovered that those very high molecular weight polymers having inherent viscosities of at least 0.8 and preferably greater than 1 may be mixed with sulfur and an organic ditertiary peroxide and cured to give useful products. This is true particularly where a reinforcing agent such as the carbon blacks and silicas are added to the composition prior to curing. In fact, by using sulfur and the organic peroxide together with a reinforcing agent, cured elastomeric products have been obtained from polymers of tetrahydrofuran which have physical properties equivalent in some respects to the polyurethane elastomers obtained when said polymers are extended with polyisocyanates. Hence this invention provides a method for making cured resinous or elastomeric products from tetrahydrofuran without the need to extend with a polyisocyanate.

The organic peroxides of the type useful in this invention generally are hereinafter called ditertiary peroxides and can be represented by the general formula:

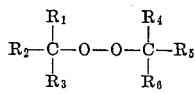

in which $R_1$, $R_2$, $R_3$, $R_4$, $R_5$, and $R_6$ are the same or different alkyl cycloalkyl, cycloalkenyl, aryl, substituted aryl, aralkyl hydrocarbon radical. The alkyl radicals can be straight chain or branched, saturated or unsaturated. Usually these radicals contain less than about 18 to 20 carbon atoms and preferably contain less than about 7 or 8 carbon atoms.

If one or more of the above R groups contains an additional peroxy group attached to a tertiary carbon atom then it is possible to have di- and tri-peroxy compounds which are useful in this invention. These di-peroxy compounds are illustrated by the following formula:

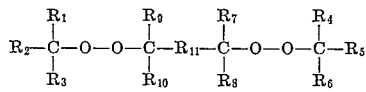

where $R_7$, $R_8$, $R_9$, $R_{10}$ and $R_{11}$ have the same meaning as that indicated for $R_1$ through $R_6$ in the general formula and the symbols of this formula which correspond to those of the general formula likewise have the same meaning as that indicated for the first formula.

Various tertiary peroxides of the general formula shown above may be used in the practice of this invention. It is obvious that in selecting a peroxide for use in this invention the peroxide should be stable at the temperature of mixing of the elastomeric composition so that it can be mixed without decomposing and that the peroxide should decompose at a reasonable rate under the curing conditions used so that the resulting radicals can enter into the curing reactions. Representative examples of such peroxides are ditertiary-butyl peroxide; ditertiaryamyl peroxide; 2,2-di-(tertiarybutylperoxy) butane; di(alpha,alpha-dimethylbenzyl) peroxide (also known as dicumyl peroxide); di(alpha,alpha-dimethyl-p-chlorobenzyl) peroxide; di(alpha,alpha-dimethyl-2,4-dichlorobenzyl) peroxide; tertiarybutyl-1-methylcyclohexyl peroxide; and peroxides formed by the oxidation of terpene hydrocarbons such as turpentine, alphapinene, para-methane and pinane.

In addition to the above ditertiary peroxides, $R_{11}$ in the formula for the diperoxy compound may also contain unsaturation wherein at least one pair of carbon atoms are joined by a double or a triple bond. Representative ditertiary peroxides of the second formula type are 2,5-ditertiary - butyl - peroxy - 2,5 - dimethylhexane, 2,5 - ditertiary amyl-peroxy-2,4-dimethylhexane, 2,5-ditertiary-butyl peroxy-2,5-dimethyl-3-hexene and 2,5-ditertiary-butyl peroxy-2,5-dimethyl-3-hexyne. The preferred organic peroxides useful in this invention are dicumyl peroxide, available commercially as Di-Cup 40C and 2,5-ditertiary-butyl-peroxy-2,5-dimethylhexane, sometimes referred to herein as DBPH, available commercially as Varox.

The quantity of ditertiary peroxide used in general is at least about 0.5% by weight, based on the polymer with the preferred amount being about 1.0 to 4.0%. Normally, the use of more than about 6% of the ditertiary peroxides results in the cured polymer having physical properties that are poorer than the optimum values obtainable at lower peroxide levels. Hence, use of amounts in excess of about 6%, say for instance, more than 10% would not generally be desirable.

However, it should be appreciated that when reinforcing fillers such as the carbon blacks or silicas are used that the percent ditertiary peroxide used preferably will be higher than when no filler is present, i.e., when curing the so-called gum stocks. The amount of additional ditertiary peroxide used and required when fillers are present is to a certain extent a function of the amount of filler used but in general the amount of extra peroxide used will be about 1.5 to 3 times that required to cure the gum stock per se.

In general, at least about 0.1% by weight of sulfur is required to give a noticeable improvement in the physical properties of the ditertiary peroxide-cured high molecular weight polymers of tetrahydrofuran. The preferred amount of sulfur is about 0.5 to 1.5% as this amount of sulfur yields the better cured products. Of course, as much as 5 to 10% or more of sulfur may be used but normally the use of larger amounts is not desired.

The tetrahydrofuran polymers useful in this invention are those having an inherent viscosity of at least about 0.8. In general, those polymers which have inherent viscosities of at least 1.3 and preferably 2 to 3.6 and higher give cured products which have tensile strength properties comparable to those obtained by organic polyisocyanate extension of the lower molecular weight polytetramethylene ether glycols. For example, a homopolymer of tetrahydrofuran having an inherent viscosity of about 2 to 3.5 when compounded with about 50 parts of carbon black (HAF), 1.6 parts of dicumyl peroxide and 1.4 parts sulfur per hundred parts of polymer and cured 10 minutes at 305° F., gave a cured polymer which had a tensile strength of 5500 pounds per square inch. This tensile strength compares very favorably with that of a polyisocyanate extended and crosslinked polyetherglycol. However, it should be understood that the cured homopolymers of tetrahydrofuran are crystalline.

Therefore, it is desirable in most instances to use a copolymer of tetrahydrofuran instead of the homopolymer as these copolymers have better resistance to crystallization. Consequently, by judicious choice of the comonomer and portions to be copolymerized with the tetrahydrofuran, a copolymer can be obtained which can be cured to yield an elastomeric product having good low temperature properties.

In carrying out the process of the present invention it is necessary merely to mix by standard milling procedures the sulfur and the ditertiary peroxide with the polymeric material which may contain inert fillers, etc. and to heat until a cure is obtained. The curing temperature may vary within wide limits depending upon the time the polymer is subjected to the curing temperature. Heating to temperatures of about 230° F. to about 450° F. for at least 5 minutes to several hours is ordinarily adequate. Longer cure times and/or higher temperatures can be used, but generally the best physical properties appear to be obtained with a relatively short cure time, usually about 5 to 40 minutes at about 250 to 350° F. with 10–30 minutes being preferred.

The following examples will better illustrate the nature of the present invention. However, the invention is not intended to be limited to these examples. Parts are by weight unless otherwise indicated and the inherent viscosities were measured at 30° C. in a chloroform solution containing 0.3 gram of polymer per 100 ml. of chloroform.

The term "swelling ratio" as used herein is reported as the ratio of the volume of the swollen rubber after 70 hours contact at 25° C. with chloroform containing 0.1 percent of the antioxidant, beta naphthylamine, to the volume of the dried rubber on a filler-free basis. The solubility values are expressed as percent by weight solubility of the vulcanizate on a filler-free basis after standing in chloroform at 25° C. for 70 hours.

PREPARATION OF HIGH MOLECULAR WEIGHT POLYMER

*Example I*

(A) PREPARATION AT HIGH CATALYST LEVELS

A high molecular weight polymer of tetrahydrofuran was prepared as follows: 200 parts of tetrahydrofuran and 25 parts of boron trifluoride were mixed at —60° C. in a bottle which was flushed with nitrogen and sealed with a screw cap. The resulting solution was placed in a cold box at 10° C. and allowed to stand for 2 months. At this time the polymerized mass was removed from the cold box and transferred to a wash mill and washed with several volumes of water to remove most of the unreacted tetrahydrofuran and catalysts. The wet polymer from the wash mill was dried in an air oven. The dry polymer had an inherent viscosity of 1.35.

This homopolymer of tetrahydrofuran was then mixed with about 2 parts of dicumyl peroxide and 1 part sulfur and cured by heating in a press at 300° F. for 20 minutes. This cured polymer was no longer soluble in benzene.

*Example II*

(B) PREPARATION AT INTERMEDIATE CATALYST LEVELS

A ten percent solution by weight of boron trifluoride and tetrahydrofuran was prepared at a temperature below 0° C. and allowed to stand in a closed container at room temperature for 41 hours. At this time the polymerization reaction was quenched wtih several volumes of water and the separated polymer was placed on a wash mill and washed with water until free of acid. The washed and dried polymer had an inherent viscosity of 3.

Another portion of the 10% boron trifluoride solution in tetrahydrofuran was allowed to react for 112 hours before being quenched, washed and dried to remove the occuled wash water. This 112 hour reaction product also had an inherent viscosity of about 3. The polymers obtained from the 41 hour and the 112 hour reaction were combined and this mixture was used for curing studies with various ditertiary peroxides and sulfur.

*Example III*

(C) PREPARATION AT LOW CATALYST LEVELS

Another tetrahydrofuran polymer was made by the procedure of Example II except the catalyst level was only 5% by weight instead of 10%. This polymer had an inherent viscosity of 2.8 and was used for curing studies with various peroxides and sulfur.

*Example IV*

(D) PREPARATION AT VERY LOW CATALYST LEVEL (TRACE)

A commercial grade of tetrahydrofuran was purified by distillation under nitrogen and from lithium aluminum hydride. The purified tetrahydrofuran was stored under nitrogen. Portions of this purified tetrahydrofuran were polymerized with boron trifluoride as a catalyst at 32° F. and 70° F. The method used for polymerizing the tetrahydrofuran was as follows: First, the polymerization reactor was dried in a nitrogen atmosphere; then a thousand parts of the purified tetrahydrofuran was added to the reactor and cooled to about 0° F. while maintained under a nitrogen atmosphere; then 1.5 parts of boron trifluoride was bubbled into the reactor followed by 1.5 parts of ethylene oxide; then the tetrahydrofuran was allowed to polymerize at either 30° or 70° F. until the desired equilibrium was obtained. At this point the polymerization reaction was quenched by adding several volumes of water. The addition of the water precipitated the polymer which was washed with warm water upon a wash mill until the water from the mill was substantially free of catalyst. Then the washed polymer was dried in an air oven.

When the polymerization temperature was maintained at 32° F., the dried polymer of tetrahydrofuran had an inherent viscosity of at least 2. But if the polymerization occurred at about 70 to 80° F. the inherent viscosity was about 1.4. Thus, by using a small amount of a co-catalyst or promoter such as ethylene oxide, trimethylene oxide, dioxalane or other monomeric epoxides, in conjunction with the boron trifluoride, it is possible to produce at very low catalyst levels, polymers of tetrahydrofuran which have inherent viscosities of at least 1 and generally of 2 and higher which are useful in this invention. Furthermore, these high molecular weight polymers are produced in a relatively short time.

The homopolymers of tetrahydrofuran are very crystalline regardless of the catalyst level used in their preparation and exhibit appreciable cold draw while determining the tensile strength on the Instron tester or other testers. To minimize the cold draw problem, all samples used for tensile strength determination on the Instron tester were held at 100° F. for one hour and then cooled to room temperature immediately prior to being placed on the Instron tester. In this regard, the effect of this heat treatment at 100° F. for one hour on the cured and uncured polymers of tetrahydrofuran is worth noting. To be specific the uncured polymer of this example, after aging one week at 70° F. was highly crystalline and had a cold draw tensile of 4000 pounds per square inch and a 580% elongation. But when this uncured polymer was heat aged for 1 hour at 100° F., it heat flowed like a very viscous liquid. The sulfur and ditertiary peroxide treated and cured polymer would not heat flow while maintained for several hours at 100° F. This cured polymer also was insoluble in benzene.

Example V
CURING GUM STOCK

The polytetrahydrofuran (Poly THF) from Example III was used in these curing experiments. The polymer, sulfur and peroxide, either Di-Cup 40C or Varox, were added on the mill and the samples were cured at 310° F. The test data are shown in Tables 1 and 2 for these cured samples.

TABLE 1.—DICUMYL PEROXIDE AND SULFUR CURE OF POLY THF

| Recipe, by parts | A | B | C |
|---|---|---|---|
| Poly THF | 100.0 | 100.0 | 100.0 |
| Di-Cup 40C | 10.0 | 5.0 | 2.5 |
| Sulfur | 1.0 | 1.0 | .5 |
| Cure time, minutes: | Tensile Strength, p.s.i./Elongation, percent | | |
| 10 | 3,248/640 | 3,360/780 | 4,905/600 |
| 20 | 3,464/640 | 3,930/640 | 5,275/640 |
| 40 | 3,451/640 | 3,960/700 | 5,665/690 |
| 60 | 3,700/650 | 4,125/770 | 5,424/680 |
| | 300% Modulus, p.s.i. | | |
| 10 | 550 | 390 | 1,233 |
| 60 | 228 | 315 | 1,180 |

TABLE 2.—VAROX AND SULFUR CURE OF POLY THF

| Recipe, by parts | D | E | F |
|---|---|---|---|
| Poly THF | 100.0 | 100.0 | 100.0 |
| Varox | 5.0 | 3.0 | 1.0 |
| Sulfur | 1.0 | 1.0 | 1.0 |
| Cure time, minutes: | Tensile Strength, p.s.i./Elongation, percent | | |
| 10 | 4,280/560 | 5,020/560 | 3,985/560 |
| 20 | 5,160/540 | 4,955/580 | 5,055/540 |
| 40 | 4,570/580 | 4,935/580 | 5,580/580 |
| 60 | 5,560/560 | 4,860/580 | 4,561/560 |
| | 300% Modulus, p.s.i. | | |
| 10 | 1,475 | 1,650 | 1,525 |
| 60 | 1,070 | 1,195 | 1,520 |

Example VI
CURING OF BLACK STOCK

A polymer of tetrahydrofuran (Poly THF) made according to the procedure of Example II and having an inherent viscosity of about 2.7 was used in these experiments. A masterbatch was made by milling 50 parts of carbon black (HAF) into each hundred parts of polymer. Dicumyl peroxide and sulfur, if any sulfur was used, were mixed in the masterbatch on the mill. Each sample was press cured at 300° F. for the time shown in the tabulation of data of Table 3 prior to being tested:

TABLE 3.—TABULATED DATA ON THE CURED STOCK

| Recipe No. (parts) | A | B | C | D | E |
|---|---|---|---|---|---|
| Masterbatch | 150 | 150 | 150 | 150 | 150 |
| Dicumyl Peroxide | 4.8 | 7.2 | 4.8 | 4.8 | 7.2 |
| Sulfur | | | 2.2 | 3.0 | 3.0 |
| Cure Time, minutes: | Tensile Strength, p.s.i./Elongation, Percent | | | | |
| 10 | 2,434/400 | 2,019/410 | 3,314/590 | 3,574/680 | 3,360/600 |
| 20 | 2,441/480 | 1,846/410 | 3,235/650 | 3,212/620 | 3,216/595 |
| 60 | 2,135/420 | 1,481/400 | 2,180/590 | 2,283/580 | 1,990/585 |
| | 300% Modulus, p.s.i. | | | | |
| 10 | 2,070 | 1,717 | 1,365 | 1,304 | 1,405 |
| 20 | 1,917 | 1,636 | 1,230 | 1,306 | 1,460 |
| 60 | 1,730 | 1,335 | 1,480 | 1,468 | 1,010 |

Example VII
CURING OF BLACK STOCK

The polymer of tetrahydrofuran used in this example was prepared by the intermediate catalyst level technique described in Example II with the polymerization temperature being 25° C. and the polymerization time being 88 hours. This polymer had an inherent viscosity of 3.0.

This polymer was compounded with 40 parts of medium process channel black (MPC) for each 100 parts of polymer to form a black-loaded masterbatch. Then this black-loaded masterbatch was compounded on the mill with the specified amount of sulfur and the denoted ditertiary peroxide and then was cured at 305° F. Test data on the cured samples are shown in Tables 4 and 5.

TABLE 4.—DATA ON DICUMYL PEROXIDE AND SULFUR CURED BLACK STOCK

| Recipe No. (parts) | A | B | C | D | E |
|---|---|---|---|---|---|
| Masterbatch | 140 | 140 | 140 | 140 | 140 |
| Dicumyl Peroxide | 1.6 | 3.2 | 5.0 | 5.0 | 7.6 |
| Sulfur | 1.4 | 0.7 | 0.7 | 1.4 | 0.7 |
| Cure time, minutes: | Tensile Strength, p.s.i./Elongation, Percent | | | | |
| 10 | 5,500/670 | 5,438/705 | 4,208/610 | 5,350/740 | 4,139/610 |
| 20 | 5,145/640 | 5,386/725 | 3,929/560 | 4,094/605 | 3,396/540 |
| 40 | 4,953/740 | 5,091/720 | 3,567/530 | 3,519/600 | 2,991/505 |
| 60 | 3,945/646 | 4,000/640 | 3,214/530 | 3,000/550 | 2,206/440 |
| | 300% Modulus, p.s.i. | | | | |
| 10 | 1,845 | 1,652 | 1,148 | 1,617 | 1,364 |
| 60 | 1,816 | 1,741 | 1,130 | 1,005 | 1,290 |

TABLE 5.—VAROX[1]-SULFUR CURE OF BLACK STOCK

| Recipe, No. | 10 | 11 | 12 |
|---|---|---|---|
| Masterbatch, parts | 140 | 140 | 140 |
| Varox, parts | 4.5 | 9.4 | 19.0 |
| Sulfur, parts | 1.0 | 1.0 | 1.0 |
| Cure time, minutes: | Tensile Strength, p.s.i./Elongation, Percent | | |
| 10 | 5,164/710 | 4,714/720 | 4,075/770 |
| 20 | 4,575/720 | 4,710/740 | 4,200/770 |
| 30 | 4,858/690 | 3,650/710 | 3,510/740 |
| 4 | 4,434/660 | 2,590/600 | 1,981/590 |
| | 300% Modulus, p.s.i. | | |
| 10 | 1,709 | 1,250 | 868 |
| 20 | 1,302 | 859 | 778 |
| 30 | 1,649 | 1,107 | 918 |
| 40 | 1,623 | 1,314 | 1,000 |

[1] Varox is the tradename of a commercial product containing 50% of 2,5-ditertiary-butyl peroxy-2,5-dimethyl hexane (DBPH).

Example VIII

A low molecular weight poly (tetrahydrofuran) was used in this example to show that the molecular weight of the poly (tetrahydrofuran) must exceed certain limits to be curable with sulfur and peroxide.

The poly (tetrahydrofuran) used in this example was a commercial sample of a poly (tetramethylene ether) glycol of about 3000 molecular weight. This commercial polytetrahydrofuran (100 parts), sulfur (1.0 part) and Di-Cup 40C (10 parts) were placed in a beaker and mixed on a hot plate. A homogeneous mass was obtained after only a few minutes mixing. The homogeneous mass was placed under nitrogen in a small ointment can. A tight cover was placed on the can and the can was placed in a 305° F. oven. The sample was still very fluid after one hour in the oven. The sample was allowed to remain in the oven at 305° F. for an additional 6.5 hours. Even after this prolonged heat treatment, the sample was still fluid and exhibited little or no evidence of curing. From this example, it appears that the molecular weight of the polymer should be in excess of 3000 to get a cured elastomeric polymer.

Since the homopolymers of tetrahydrofuran are highly crystalline, it was discovered that the amount and rate of crystallinity could be reduced by blending these polymers with varying amounts of the polymers of 1-olefins (sometimes called alpha-olefin) and curing the blends. The polymers of 1-olefins which are useful in retarding the crystallizability of poly(tetrahydrofuran) may contain from 2 to 8 carbon atoms, such as polyethylene (high or low density), polypropylene, polybutene, copolymers of ethylene and propylene and other copolymers of 1-olefins.

To illustrate this point, the homopolymer of tetrahydrofuran from Example I was blended on the mill with varying amounts of an elastomeric ethylene-propylene copolymer (about 50/50 mol percent) prepared with an aluminum alkyl-vanadium oxytrichloride catalyst to form blends. It was observed during the preparation of these blends that even a small amount of the polymer of tetrahydrofuran in the elastomeric ethylene-propylene copolymer improved the handling property of the copolymer. Furthermore, when these blends were cured with ditertiary peroxide and sulfur, the cured product had physical properties superior to that of the cured copolymer per se and slower crystallizing properties than the cured polymer of tetrahydrofuran when compared at room temperature. Hence, the polymers of tetrahydrofuran function as a nonstaining reinforcing agent for these polymers of the 1-olefins.

This may be seen from the data in Table 6 where 100 parts of the polymers or their blends were mixed with 1 part of sulfur and 10 parts of Di-Cup 40C and then cured at 280° F. for the time indicated.

TABLE 6.—CURE DATA ON BLENDS

| Polymer of tetrahydrofuran, percent | 100 | 75 | 50 | 25 | 0 |
|---|---|---|---|---|---|
| Copolymer of ethylene/propylene, percent | 0 | 25 | 50 | 75 | 100 |
| Cured 10 minutes: | | | | | |
| Tensile, p.s.i. | 3,360 | 3,035 | 1,265 | 740 | 265 |
| Elongation, percent | 650 | 740 | 700 | 740 | 705 |
| 300% Modulus, p.s.i. | 550 | 354 | 180 | 126 | 107 |
| Solubility, percent | 4.7 | 9.0 | 16.0 | 19.0 | 26.0 |
| Swelling Ratio | 7.9 | 7.7 | 7.6 | 7.2 | 6.9 |
| Cured 60 minutes: | | | | | |
| Tensile, p.s.i. | 4,040 | 2,910 | 2,027 | 705 | 315 |
| Elongation, percent | 730 | 720 | 705 | 605 | 500 |
| 300% Modulus, p.s.i. | 625 | 214 | 183 | 190 | 180 |
| Solubility, percent | 3.7 | 9.3 | 12.8 | 16.0 | 17.4 |
| Swelling Ratio | 7.5 | 7.3 | 7.3 | 6.8 | 6.3 |

On standing, the above vulcanizates of the blend of 25% copolymer of ethylene-propylene and 75% polymer of tetrahydrofuran appeared considerably less stiff or boardy than expected from their blend composition. The vulcanized poly(tetrahydrofuran) became quite stiff on standing under the same conditions.

Since these sulfur-ditertiary peroxides cured blends of the copolymer of ethylene-propylene and the polymers of tetrahydrofuran are less crystalline they are more suitable for coating wire and fabrics and for making various elastomeric or resinous articles such as molded goods than the homopolymer of tetrahydrofuran. Furthermore, since the tensile strength and percent elongation properties of these cured blends are superior to the cured copolymer per se, they offer advantages where light colored articles are desired.

Another way of retarding the crystallizability of the polymers of tetrahydrofuran is to copolymerize from about 1 to 20% of comonomer with the tetrahydrofuran. Suitable comonomers are those epoxy monomers such as the epoxy aliphatic compounds having from 2 to about 18 carbon atoms. Representative members of these epoxy aliphatic compounds are ethylene oxide, propylene oxide, butadiene monoxide, epoxides of butene, pentene, hexene, heptene, octene, styrene and mixtures thereof.

Other compounding ingredients such as clays, processing oils, waxes, tackifying agents and reinforcing agents can also be used in conjunction with this invention and can also be varied in amounts to adjust the properties of the stock to meet the specification for the particular goods being made. Normally, about 5 to 80 parts of carbon black may be used with the preferred amount being about 20 to 50 parts.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising (1) a saturated polymer of tetrahydrofuran having an inherent viscosity of at least about 0.8, (2) at least 0.2 percent by weight of sulfur and (3) from 0.5 to 10 percent by weight of the polymer of a ditertiary peroxide of the formula

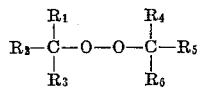

where $R_1$, $R_2$, $R_3$, $R_4$, $R_5$, and $R_6$ are selected from the radicals consisting of alkyl, alkenyl, cycloalkyl, cycloalkenyl, aryl, aralkyl and substituted aryl.

2. The composition of claim 1 wherein each of the radicals $R_1$, $R_2$, $R_3$, $R_4$, $R_5$, and $R_6$ have less than 20 carbon atoms.

3. The composition of claim 1 wherein the ditertiary peroxide is dicumyl peroxide.

4. The composition of claim 1 which contains about 5 to 80 parts of carbon black.

5. A process for curing a saturated poly(tetramethylene ether) glycol having an inherent viscosity of at least 0.8 which comprises mixing with said glycol from 0.5 to 1.5 percent by weight of sulfur and from 1 to 4 percent by weight of a ditertiary peroxide of the formula

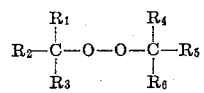

where $R_1$, $R_2$, $R_3$, $R_4$, $R_5$, and $R_6$ are selected from the radicals consisting of alkyl, alkenyl, cycloalkyl, cycloalkenyl, aryl, aralkyl and substituted aryl, and heating until a cure is obtained.

6. A composition comprising (1) a saturated polymer of tetrahydrofuran having an inherent viscosity of at least about 0.8, (2) at least 0.2 percent by weight of sulfur and (3) from 0.5 to 10 percent by weight based on the polymer of a ditertiary peroxide of the formula

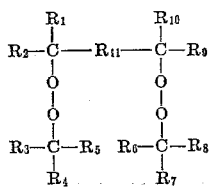

where $R_1$, $R_2$, $R_3$, $R_4$, $R_5$, $R_6$, $R_7$, $R_8$, $R_9$, $R_{10}$ and $R_{11}$ are selected from the radicals consisting of alkyl, alkenyl, cycloalkyl, cycloalkenyl, aryl, aralkyl and substituted aryl having less than 20 carbon atoms.

7. The composition of claim 6 wherein the ditertiary peroxide is 2,5-ditertiary-butyl peroxy-2,5-dimethylhexane.

8. The composition of claim 7 which contains about 5 to 80 parts of carbon black.

9. A composition comprising (1) a saturated polymer of tetrahydrofuran having an inherent viscosity of at least 1.3, (2) at least 0.2 percent by weight of sulfur and (3) from 0.5 to 10% by weight of the polymer of a ditertiary peroxide of the formula

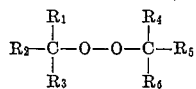

where $R_1$, $R_2$, $R_3$, $R_4$, $R_5$, and $R_6$ are selected from the radicals consisting of alkyl, alkenyl, cycloalkyl, cycloalkenyl, aryl, aralkyl and substituted aryl.

References Cited by the Examiner
UNITED STATES PATENTS

| | | |
|---|---|---|
| 2,906,738 | 9/1959 | Goldberg. |
| 2,927,098 | 3/1960 | Goldberg _____ 260—79 |
| 3,012,016 | 12/1961 | Kirk et al. _____ 260—41 |
| 3,129,204 | 4/1964 | Gilmont _____ 260—83.3 |
| 3,133,905 | 5/1964 | Snyder et al. _____ 260—2 |

OTHER REFERENCES

Walling, "Free Radicals in Solution," Wiley, 1957, pages 334 and 335.

MORRIS LIEBMAN, *Primary Examiner.*

MILTON STERMAN, *Examiner.*

T. D. KERWIN, A. H. KOECKERT,
*Assistant Examiners.*